3,048,629
PREPARATION OF FLUOROSULFUR COMPOUNDS
Kenneth Vincent Martin, Wilmington, Del., assignor to E. I. du Pont de Nemours and Company, Wilmington, Del., a corporation of Delaware
No Drawing. Filed Apr. 29, 1959, Ser. No. 809,598
5 Claims. (Cl. 260—544)

The process of the present invention relates to the preparation of sulfur-containing, fluorinated compounds, and, more particularly, to the preparation of fluorinated thiocarbonyl compounds from fluorinated olefins.

Fluorothioacetyl halides and fluorothioketones are a novel class of chemical compounds which show outstanding technical promise as monomers for the preparation of thermally stable and corrosion-resistant elastomers. Low molecular weight liquid polymers of these compounds have properties which make them suitable for use as dielectric media, hydraulic fluids and inert solvents.

It is, therefore, the principal object of the present invention to provide a method for the preparation of fluorothiocarbonyl compounds.

The object of the present invention is accomplished by a process which comprises contacting a mixture of a fluoroolefin having the general formula

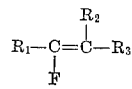

wherein $R_1$ and $R_3$ are the same or different radicals selected from the class consisting of fluorine, perfluorocarbon radicals and divalent fluorocarbon radicals formed from the combination of $R_1$ and $R_3$, and $R_2$ is a radical selected from the class consisting of hydrogen, halogen and perfluorocarbon radicals, and vaporized sulfur at a temperature of 250° C. to 750° C., but preferably at a temperature of 350° C. to 450° C., with activated carbon, and recovering a fluorothiocarbonyl compound. In accordance with the present invention, the fluorothiocarbonyl compounds are obtained by passing a mixture of vaporized sulfur and the fluoroolefin through an activated carbon bed maintained at the temperatures indicated. The process may be carried out with an inert gas carrier, such as nitrogen or any of the rare gases. The contact time of the gas mixture with the carbon should be long enough to allow the gas to come to the temperature of the active carbon bed. The fluorothiocarbonyl compounds obtained are caught in a cold trap and are then purified by distillation.

Any type of active carbon can be employed as the catalyst in the present invention. In general, however, active carbon prepared from wood, sawdust, peat, lignite and pulp-mill waste is preferred. Active carbon is obtained through carbonization of the raw material followed by an activation step which involves the controlled oxidation of the carbonized material. The preparation of active carbon is well-known in industry and a number of active carbons are commercially available.

A large variety of fluoroolefins may be employed in the process of the present invention to prepare thiocarbonyl compounds. Depending on the number of carbon atoms in the fluoroolefin and the location of the unsaturated bond, the products are either thioacetyl fluorides or thioketones. In terminally unsaturated fluoroolefins, the ketones are formed in preference to the acetyl fluorides. The fluoroolefins employed may be branched, cyclic, or internally unsaturated. As indicated by the general formula hereinabove, it is not essential that all of the substituents on the double bond be fluorine or fluorocarbon radicals. Representative examples of the fluoroolefins are tetrafluoroethylene, hexafluoropropylene, perfluorobutene-1, perfluorobutene-2-, perfluoroisobutylene, perfluoropentene-1, perfluoropentene-2, omega-hydroperfluoropentene-1, perfluorooctene-1, perfluorododecene-1, omega-hydroperfluoroheptene-1, perfluorocyclobutene, perfluorocyclohexene, trifluoroethylene, chlorotrifluoroethylene and the like. The preferred starting materials employed in the process of the present invention are those having the general formula $CF_2=CF—C_nF_{2n}X$, where $n$ is from 0 to 10 and X is selected from the class consisting of fluorine and hydrogen.

The ratio of the sulfur to the fluoroolefin is not critical; however, it is preferred to employ at least equal molar quantities of sulfur and the fluoroolefin.

The process of the present invention is further illustrated by the following examples.

EXAMPLES I TO VI

The attached table demonstrates the preparation of thiocarbonyl compounds in accordance with the present invention and shows the conditions and results employed in each example. Vaporized sulfur, obtained by heating sulfur in a stainless steel vessel and passing nitrogen through the molten sulfur, is admixed with the fluoroolefin indicated, and passed into a 1 in. nickel tube placed in an upright position in a tube furnace. The flow of sulfur was regulated by the temperature of the sulfur pot and the flow in the nitrogen. The tube contained a 7 in. packed bed of activated carbon, "Cheney CH-2," commercially available from the Barnaby Cheney Corp., heated by the tube furnace to the temperature indicated. The effluent gas was passed into a cold trap maintained at −78° C. which condensed the thiocarbonyl products formed. The thiocarbonyl products were isolated and purified by distillation from the cold trap.

Table I

| Example | Fluoroolefin | Flow Rate, ml./min. | Temp. of Sulfur Vessel, ° C. | Flow Rate of Nitrogen ml./min. | Carbon Bed Temp., ° C. | Reaction Time | Product |
|---|---|---|---|---|---|---|---|
| I | tetrafluoroethylene | 150 | 422 | 150 | 422 | 120 min. | 8 ml. of trifluorothioacetyl fluoride. |
| II | ___do___ | 150 | 420 | 150 | 500 | 240 min. | 30 ml. of trifluorothioacetyl fluoride. |
| III | chlorotrifluoroethylene | 150 | 440 | 150 | 480 | 180 min. | 64 g. of chlorodifluorothioacetyl fluoride. |
| IV | perfluorocyclobutene | 150 | 420 | 100 | 470 | 240 min. | 9.8 g. of perfluorothiophane-α-thione. |
| V | trifluoroethylene | 150 | 420 | 150 | 400 | 120 min. | difluorothioacetyl fluoride. |
| VI | hexafluoropropylene | 150 | 440 | 160 | 370–450 | 4 hrs. | 130 g. hexafluorothioacetone, 30 g. hexafluorothioacetone dimer. |

The examples set forth are illustrations of the invention described and are not to be construed as limiting the invention. Various modifications of the process equipment will be apparent to those skilled in the art and are included in the scope of the present invention. The process described provides an economic and ready manufacture of fluorothiocarbonyl compounds from fluoroolefins and sulfur.

I claim:
1. A process for the preparation of fluorothiocarbonyl compounds which comprises contacting at a temperature of 250° C. to 750° C., a mixture of vaporized sulfur and a non-aromatic fluoroolefin having the general formula

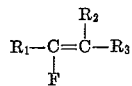

wherein $R_1$ and $R_3$ are radicals selected from the class consisting of fluorine, fluorocarbon radicals and divalent fluorocarbon radicals formed from the combination of $R_1$ and $R_3$, and $R_2$ is a radical selected from the class consisting of hydrogen, fluorine, chlorine, and fluorocarbon radicals, with active carbon.

2. A process for the preparation of fluorothiocarbonyl compounds which comprises contacting at a temperature of 350° C. to 450° C., a mixture of vaporized sulfur and a fluoroolefin having the general formula $$CF_2=CF-C_nF_{2n}X$$

where $n$ is an integer from 0 to 10 and X is from the class consisting of hydrogen and fluorine, with active carbon.

3. The process as set forth in claim 1 wherein the olefin is chlorotrifluoroethylene.

4. The process as set forth in claim 1 wherein the fluoroolefin is tetrafluoroethylene.

5. The process as set forth in claim 1 wherein the fluoroolefin is hexafluoropropylene.

References Cited in the file of this patent
UNITED STATES PATENTS 2,922,816    Bruce                Jan. 26, 1960
2,962,529    Marquis            Nov. 29, 1960

OTHER REFERENCES

Brandt et al.: J. Chem. Soc. (London), vol. of 1952, page 2201.

Lovelace: "Aliphatic Fluorine Compounds," page 222 (1958).